May 22, 1923.
J. C. SANDER
METHOD OF UNITING METAL PLATES
Filed May 10, 1920
1,455,811
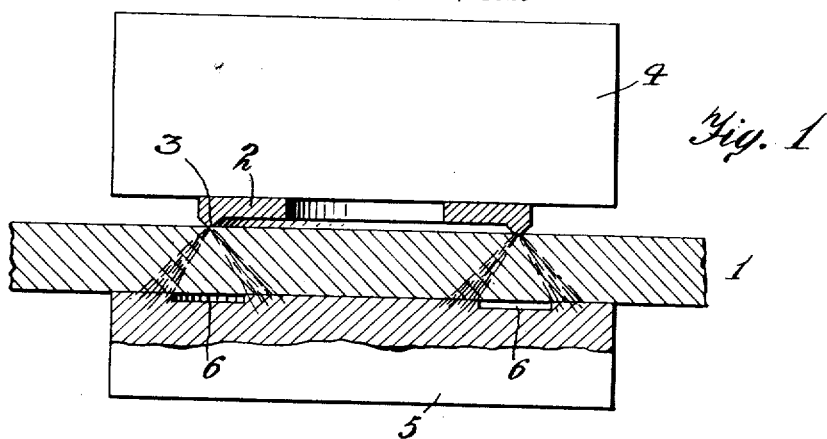
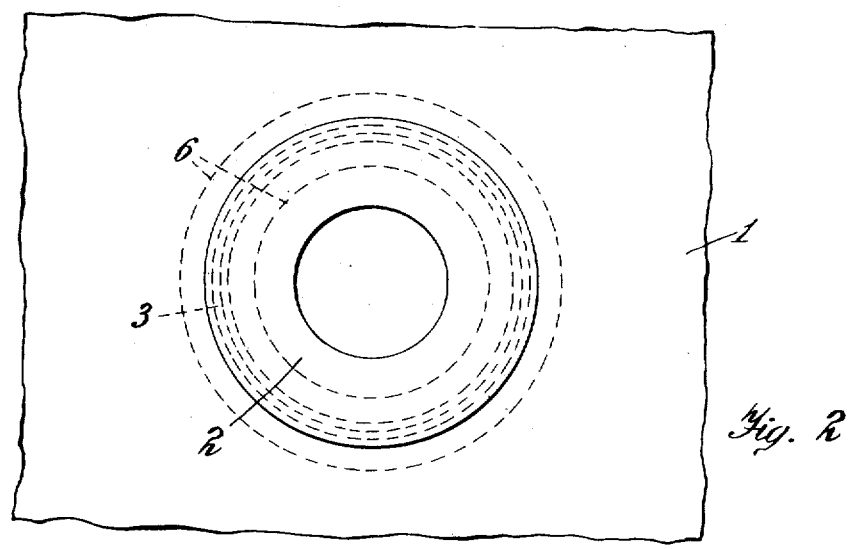
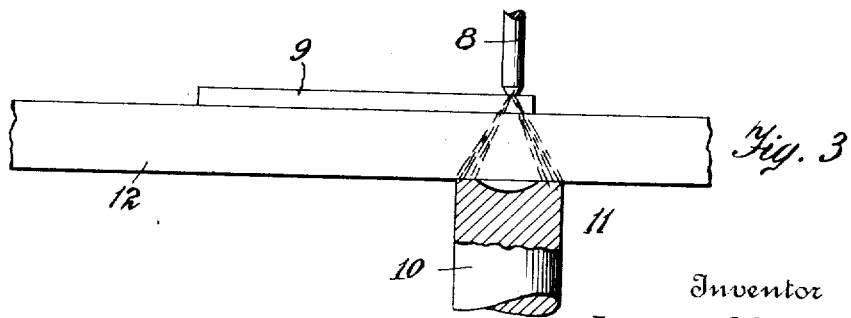
Inventor
JACOB C. SANDER
By his Attorneys Patented May 22, 1923.

1,455,811

UNITED STATES PATENT OFFICE.

JACOB C. SANDER, OF LYNN, MASSACHUSETTS, ASSIGNOR TO THOMPSON SPOT WELDER COMPANY, OF BOSTON, MASSACHUSETTS, A CORPORATION OF MASSACHUSETTS.

METHOD OF UNITING METAL PLATES.

Application filed May 10, 1920. Serial No. 380,083.

*To all whom it may concern:*

Be it known that I, JACOB C. SANDER, a citizen of the United States, and a resident of Lynn, in the county of Essex and State of Massachusetts, have invented certain new and useful Improvements in Methods of Uniting Metal Plates, of which the following is a specification.

My present invention relates to a method or process of uniting metal plates or parts and is of particular utility in electrically welding a thin to a relatively thicker plate.

The object of the invention is to make possible the welding, by means of an electric current and pressure, of two plates or parts which are of relatively different thicknesses and particularly in such cases as where it is not possible to form a welding ridge or projection on the thicker part.

I am aware that plates of different thicknesses have heretofore been welded together by providing the thicker plate with contact points or ridges which serve to concentrate the heating current and allow the parts to be welded together by means of the ridge before the heavy mass of metal could conduct the heat away. My present invention however deals with the problem of welding thick and thin plates in such cases where it is not possible or practical to form contact points or a welding ridge on the thicker plate.

In order to do this I so arrange the electrodes with relation to the work that the electrode which engages the heavier plate does not make direct contact with it in a straight line with the point at which the current is concentrated in the thin plate.

The invention consists in the method of uniting metal plates or parts by an electric welding process hereinafter more particularly described and then specified in the claims.

In the accompanying drawings, Fig. 1 is a diagrammatic illustration of two metal plates as assembled together between electrodes previous to being welded in accordance with this invention.

Fig. 2 is a plan view of the assembled plates.

Fig. 3 is a diagrammatic view illustrating the application of the principle of the invention to spot welding the plane surfaces of two plates.

The invention, without in any manner limiting it to this use, will be described as employed in welding a metal washer to a relatively thicker supporting plate.

In the drawings, 1 indicates the thicker or the supporting plate and 2 indicates the washer which is of considerably thinner gage metal. The washer 2 is provided with an annular ridge 3 on one surface thereof and preferably at or near its outer periphery.

The plates are assembled together between electrodes 4, 5 of an electric welding apparatus of any suitable character. The general arrangement and mode of operation of electric welding machines is now so universally known in the art that any detailed description or illustration is deemed unnecessary for the present purpose of describing this invention. The plates are assembled with the ridge 3 in contact with the plate 1.

The upper electrode 4 may be of flat surface contacting with the whole rear face of the washer 2, the ridge 3 serving to restrict the path of the current in flowing from one plate to the other.

The lower electrode 5 is provided in its contacting face with an annular groove or depression 6. In assembling the work between the electrodes, it is so placed with respect to the electrode 5 that the groove 6 spans the line of contact of the ridge 3. In other words, the electrode 5 does not make contact with the plate 1 in a direct line with the point of contact or ridge 3, but only at points laterally removed from said line.

Upon passing the electric heating current from one electrode to the other through the work, the current flows from many points of contact between the electrode 5 and plate 1 and converges at the ridge 3 as indicated in dotted lines in Fig. 1. This causes the ridge 3 and the portion of the plate 1 in contact therewith to become highly heated and plastic, after which the usual welding pressure is applied by means of the electrodes and the ridge 3 is upset and forced down into the metal of the plate 1 and the parts intimately joined together.

By keeping the electrode 5 out of direct contact with the plate 1 in the line of the ridge 3 the current is made to travel through a larger area of the plate and it converges at the ridge from many places in the plate. Also by not having the electrode in direct contact with the plate at the proposed area of weld, the electrode does not carry off the heat and thick to thin plates can readily be spot welded by their plane faces as indicated in Fig. 3.

In this figure the spot-welding electrode 8 contacts with the back of the thin plate 9 and the co-operating electrode 10 is somewhat larger in diameter than the electrode 8 and is provided with a central depression 11. This electrode contacts with the back of the heavy plate 12 in such manner that the contacting end of the electrode 8 is in line with the depression 11. The current flows from a multiplicity of contact points between the electrode 10 and plate 12 and converges at the single point of contact between the plate 9 and electrode 8.

What I claim as my invention is:—

1. The method of uniting metal parts consisting in applying an electrode to one side of the work and in contact therewith in line with the proposed weld, applying an electrode to the opposite side of the work said electrode having a depression in its contacting surface in the line of proposed weld, but being engaged with said opposite side of the work at both sides of said line, passing an electric current from one electrode to the other and applying pressure to weld the parts together.

2. The method of uniting metal parts consisting in assembling the work between electrodes one of which contacts with the work in line with the proposed weld, while the other does not contact with the work in said line but engages the same at opposite sides thereof, passing an electric current from one electrode to the other whereby the current flows through the work at an angle and applying pressure to force the heated parts together and complete the weld.

3. The method of uniting metal parts consisting in applying an electrode making a single contact with the work at one side thereof, applying a second electrode to the other side of the work and making a plurality of contacts therewith, out of line with said single contact and to opposite sides of said line none of said plurality of contacts being in line with the weld and place of contact of the first electrode, passing an electric current from one electrode to the other angularly through the work and applying pressure to the heated section.

4. The method of welding metal plates consisting in assembling the plates between electrodes, one of which makes a single contact with the work while the other makes a plurality of contacts therewith, at opposite sides of a line passing directly through the first-named contact passing an electric heating current from one electrode to the other whereby the current flows from a multiplicity of points on one side and converges to the single contact point on the other and applying pressure to force the heated parts together and complete the weld.

5. The method of welding metal parts consisting in providing a ridge or protuberance on one of the parts contacting said ridge with the other part, applying electrodes to the backs of said parts and maintaining the electrode contacting with the second-named part out of direct contact therewith in line with the ridge of the first part but in contact at both sides of said line, passing an electric current from one electrode to the other in such manner that it converges at the ridge and applying pressure to force the parts together.

6. The method of uniting a washer to a supporting plate, consisting in providing the washer with an annular ridge, placing said ridge in contact with the plate, applying an electrode to the washer, providing an electrode having an annular groove in its contact face, applying the latter named electrode to the back of the plate in such manner that the groove spans the line of contact of said ridge, passing an electric current from one electrode to the other and applying pressure to force the parts together.

Signed at New York in the county of New York and State of New York this 6th day of May, A. D., 1920.

JACOB C. SANDER.